(12) United States Patent
Luo

(10) Patent No.: US 8,412,919 B2
(45) Date of Patent: Apr. 2, 2013

(54) METHOD FOR CONTROLLING MULTI-PORT NETWORK INTERFACE CARD

(75) Inventor: Peng-Fang Luo, Shanghai (CN)

(73) Assignee: Inventec Corporation, Taipei (TW)

( * ) Notice: Subject to any disclaimer, the term of this patent is extended or adjusted under 35 U.S.C. 154(b) by 330 days.

(21) Appl. No.: 12/978,375

(22) Filed: Dec. 23, 2010

(65) Prior Publication Data
US 2012/0117366 A1    May 10, 2012

(30) Foreign Application Priority Data
Nov. 10, 2010   (CN) .......................... 2010 1 0551108

(51) Int. Cl.
*G06F 15/16* (2006.01)
*G06F 15/173* (2006.01)

(52) U.S. Cl. ................ 713/1; 713/2; 713/100; 709/226; 709/239; 709/250; 370/230; 370/359; 370/366

(58) Field of Classification Search ................... 713/1, 2, 713/100; 709/226, 239, 250; 370/230, 260, 370/359
See application file for complete search history.

(56) References Cited

U.S. PATENT DOCUMENTS

| | | | | |
|---|---|---|---|---|
| 5,987,507 | A * | 11/1999 | Creedon et al. ............... | 709/215 |
| 6,148,002 | A * | 11/2000 | Patel et al. ..................... | 370/438 |
| 6,393,483 | B1 * | 5/2002 | Latif et al. ..................... | 709/226 |
| 6,732,186 | B1 * | 5/2004 | Hebert .......................... | 709/239 |
| 7,672,300 | B1 * | 3/2010 | Medina et al. ................ | 370/366 |
| RE41,397 | E * | 6/2010 | Latif et al. ..................... | 709/226 |
| 8,018,924 | B1 * | 9/2011 | Medina et al. ................ | 370/366 |
| 8,027,256 | B1 * | 9/2011 | Subramanian et al. ....... | 370/231 |

* cited by examiner

*Primary Examiner* — M Elamin
(74) *Attorney, Agent, or Firm* — Jianq Chyun IP Office

(57) ABSTRACT

A method for controlling a multi-port Network Interface Card (NIC) is provided. In a computer using the multi-port NIC with a plurality of NIC ports, a plurality of control options is set into a Basic Input/Output System (BIOS) setup menu, so that a user individually controls the NIC ports. Furthermore, due to the characteristic that after a reference code process in the BIOS restarts a system, the set of hardware becomes effective, an action of controlling the NIC ports is set before a reference code process restarts the system.

6 Claims, 2 Drawing Sheets

METHOD FOR CONTROLLING MULTI-PORT NETWORK INTERFACE CARD

CROSS-REFERENCE TO RELATED APPLICATION

This application claims the priority benefit of China application serial no. 201010551108.1, filed on Nov. 10, 2010. The entirety of the above-mentioned patent application is hereby incorporated by reference herein and made a part of this specification.

BACKGROUND OF THE INVENTION

1. Field of the Invention

The present invention generally relates to a network device, in particular, to a method for controlling a multi-port Network Interface Card (NIC) in a computer.

2. Description of Related Art

A conventional NIC usually has a single NIC port. When a server adopts an Intel 82576 dual-port NIC, the NIC of this kind is a device having two functions being Function 0 and Function 1, in which each function controls one of the two NIC ports of the NIC. If a user needs to control one of the two NIC ports of the dual-port NIC, the user needs to enter an Electrically Erasable Programmable Read-Only Memory (EEPROM) of the NIC under an operating system through tools provided by Intel, finds an address of controlling the NIC port, and controls the single NIC port. Therefore, the operation of the existing technology is complex.

SUMMARY OF THE INVENTION

Accordingly, the present invention is directed to a method for controlling a multi-port NIC, capable of enabling a user to individually set/control a plurality of NIC ports of the same multi-port NIC through a Basic Input/Output System (BIOS).

The present invention provides a method for controlling a multi-port NIC. A multi-port NIC with a plurality of NIC ports, a BIOS, and a control unit are provided in a computer. The BIOS has a memory, an address space is defined in the memory, and an option catalog is established in the address space, in which the option catalog includes a plurality of disable instructions corresponding to the NIC ports. The control unit is electrically connected to the memory of the BIOS and the multi-port NIC, and generates a plurality of control signals corresponding to the NIC ports. The computer is started, and the control signals respectively disable the NIC ports corresponding to the disable instructions, when the BIOS detects that the disable instructions are effective. The computer is restarted, and the disabled NIC ports stop performing data transmission with outside of the computer.

Based on the above mentioned, in the present invention, a plurality of control options is set in a BIOS, so that a user may respectively control a plurality of NIC ports of the same NIC. According to the control options, the BIOS may disable one of the NIC ports through a control unit.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
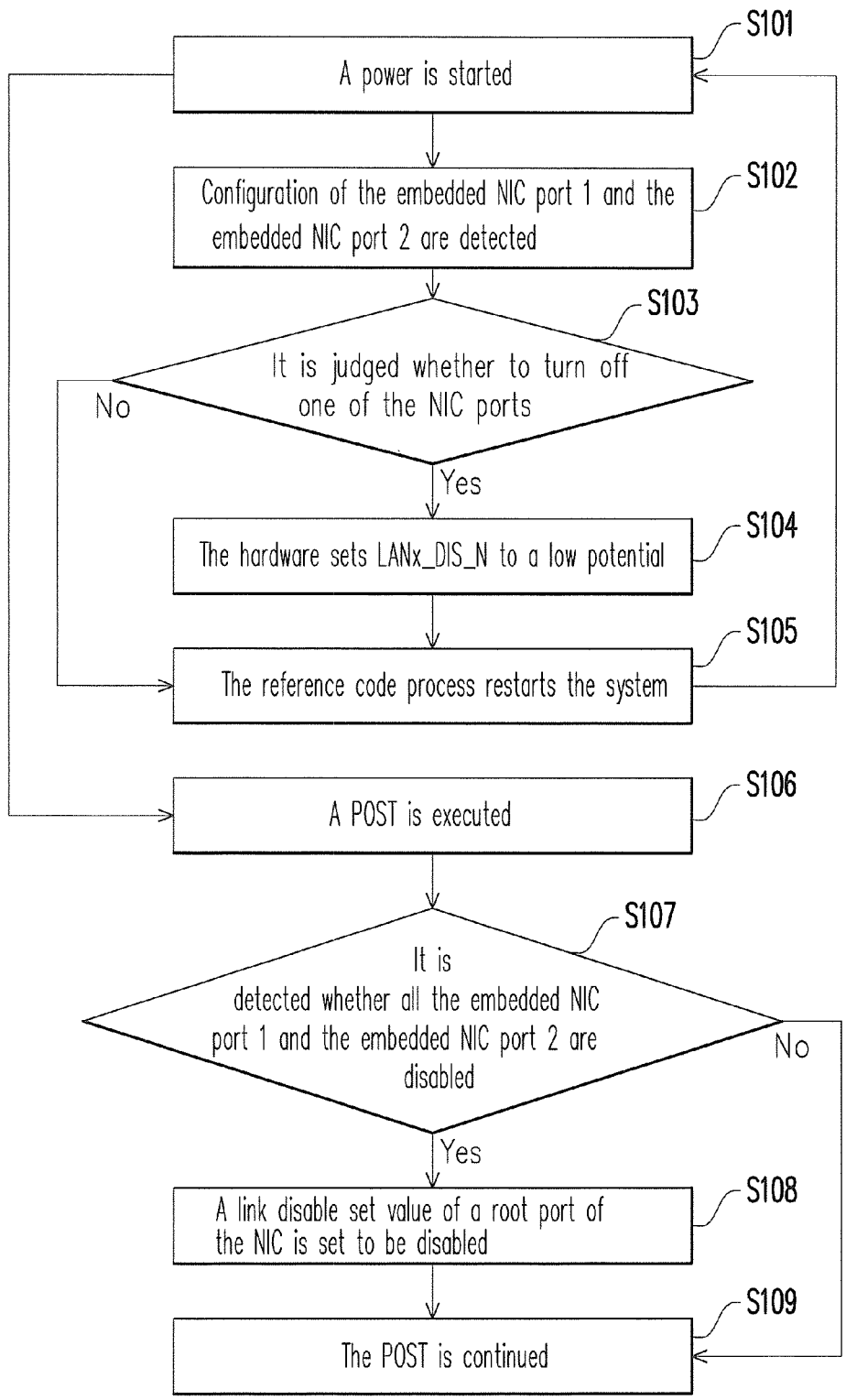
FIG. 1 shows a method for controlling a dual-port NIC by using a BIOS according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
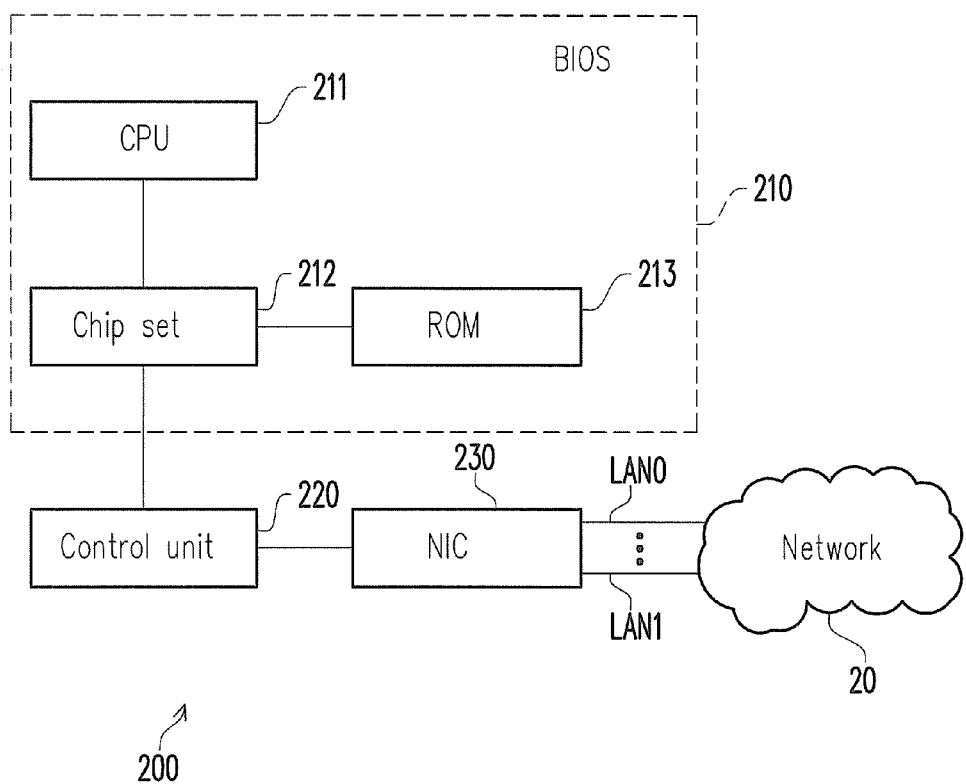
FIG. 2 is a schematic view of functional modules of a network device according to an embodiment of the present invention.

FIG. 1 is a schematic view of processes of a method for controlling an NIC by using a BIOS according to an embodiment of the present invention, and FIG. 2 is a schematic view of functional modules of a network device according to an embodiment of the present invention. In this embodiment, the network device may be a computer 200. The computer 200 includes a BIOS 210, a control unit 220, and a multi-port NIC 230 with a plurality of NIC ports. The multi-port NIC 230 at least has NIC ports LAN0 and LAN1, as shown in FIG. 2.

The BIOS 210 includes a Central Processing Unit (CPU) 211, a chip set 212, and a Read Only Memory (ROM) 213. The ROM 213 saves a BIOS firmware code. The CPU 211 reads and executes the BIOS firmware code through the chip set 212, for implementing the BIOS 210. An address space is defined in the memory 213 of the BIOS 210, and an option catalog is established in the address space, in which the option catalog includes a plurality of disable instructions corresponding to the NIC ports LAN0 and LAN 1.

The control unit 220 may be a micro controller, a micro processor, a programmable logic device (PLD), a complex programmable logic device (CPLD), a field programmable gate array (FPGA), or other control units.

The control unit 220 is electrically connected between the BIOS 210 and the multi-port NIC 230. In this embodiment, a communication interface between the control unit 220 and the BIOS 210 is implemented by a General Purpose Input/Output (GPIO) interface. The control unit 220 receives a clock signal, a data stream, and a frame recognition signal from the BIOS 210. The control unit 220 receives instructions/signals sent by the BIOS 210 according to a preset data transmission protocol. This embodiment does not limit an implementation manner of the data transmission protocol. For example, the control unit 220 may read various signals (for example, the frame recognition signal and the data stream etc.) on the basis of a timing of the clock signal. Therefore, the control unit 220 may correctly read the frame recognition signal, and discriminates starting points of a plurality of data segments in the data stream according to the frame recognition signal, so as to interpret first data in the data stream. Further, the control unit 220 further generates a plurality of control signals corresponding to the NIC ports of the multi-port NIC 230 according to the first data.

It should be particularly noted that in FIG. 2, an NIC port control end of the multi-port NIC 230 is connected to the control unit 220, and other output/input ends of the NIC 230 are not shown. A complete connection architecture of the multi-port NIC 230 needs to be described according to a specification of the selected product. Persons applying this embodiment may select various externally connected NICs, embedded NICs (network interface controllers), and other products in the current or future market according to design demands and teachings of this embodiment, for implementing the NIC 230.

The NIC 230 has a plurality of NIC ports, for example, the NIC ports LAN0 and LAN1 as shown in FIG. 2. The NIC 230 is connected to a network 20 through the NIC ports LAN0 and LAN 1. For example, the persons applying this embodiment may select an Intel 82576 dual-port NIC having two NIC ports.

In this embodiment, an option function chart is set in a user interface (UI) of the BIOS 210. The option function chart has a plurality of control options, respectively corresponding to the disable instructions in the option catalog in the address space, in which the disable instructions respectively control the different NIC ports of the NIC 230. For example, an embedded NIC port 1, an embedded NIC port 2, and other control options are set in a setup menu interface, so that the user may conveniently individually control the two NIC ports LAN0 and LAN1 of the Intel 82576 dual-port NIC. Referring to FIGS. 1 and 2, after a power is started (Step S101), the BIOS 210 performs a reference code process, so as to detect configuration (or set values) of the embedded NIC port 1, the embedded NIC port 2, and other control options (Step S102).

Next, in Step S103, the BIOS 210 judges whether to disable one of the plurality of NIC ports according to a detection result of Step 102. If the control options indicate to disable one of the plurality of NIC ports LAN0 and LAN1, the BIOS 210 orders the control unit 220 to output the corresponding control signal, so as to disable the corresponding NIC port (Step S104). For example, the control unit 220 may disable the corresponding NIC port by changing a logic level of a corresponding pin of the multi-port NIC 230 (Step S104).

In another embodiment, the option catalog further includes enable instructions of the multi-port NIC. When the BIOS 210 detects that the enable instructions are effective, the control signals respectively enable the NIC ports LAN0 and LAN1 corresponding to the enable instructions. In Step S103, the BIOS 210 judges whether to enable one of the plurality of NIC ports according to the detection result of Step S102.

For example, if the control options indicate to disable the embedded NIC port 1 and enable the embedded NIC port 2, the BIOS 210 orders the control unit 220 to disable the NIC port LAN0 and enable the NIC port LAN1 (Step S104).

The Intel 82576 dual-port NIC is taken as an example, for example, the NIC 230 has pins LAN0_DIS_N and LAN1_DIS_N. The pins LAN0_DIS_N and LAN1_DIS_Nr respectively control enable states of the NIC ports LAN0 and LAN1. If in Step S103, the BIOS 210 judges to disable/turn off the NIC port LAN0 of the NIC 230, in Step S104, the BIOS 210 sends an instruction to the control unit 220 through a GPIO port, the control unit 220 changes a logic level of the pin LAN0_DIS_N corresponding to the NIC port LAN0 to a low potential, and maintains a logic level of the pin LAN1_DIS_N corresponding to the NIC port LAN1 at a high potential. Similarly, if in Step S103, the BIOS 210 judges to disable/turn off the NIC port LAN1, in Step S104, the BIOS 210 sends an instruction to the control unit 220, the control unit 220 changes the logic level of the pin LAN1_DIS_N corresponding to the NIC port LAN1 to the low potential, and maintains the logic level of the pin LAN0_DIS_N corresponding to the NIC port LAN0 at the high potential.

That is to say, if the user intends to turn off the NIC port LAN0 or LAN1, the hardware may set the corresponding pin LAN0_DIS_N or LAN1_DIS_N of the NIC 230 to the low potential. After the pin LAN0_DIS_N or LAN1_DIS_N of the NIC 230 is set to the low potential, the set of the hardware becomes effective after the computer 200 is restarted. Therefore, in this embodiment, due to the characteristic that an Intel reference code process in the BIOS restarts a system, an action of controlling the NIC ports is set before a reference code process restarts the system 200. For example, after Step S104 is completed, the BIOS 210 executes the reference code to restart the computer 200 (Step S105). If a judgment result of Step 103 is that the NIC ports LAN0 and LAN1 are not turned off, the BIOS 210 directly executes Step S105 to restart the computer 200. Here, the set of the hardware of the NIC 230 becomes effective, and the disabled NIC ports stop performing the data transmission with the outside of the computer 200. When the computer 200 is restarted, it is equivalent to return to Step S101, the reference code is reset, the reference code process is completed, and then Step S106 is performed.

In Step S106, the BIOS 210 starts to execute a Power On Self Test (POST). In the POST, the BIOS 210 detects the control options (Step S107). If a judgment result of Step S107 is no, that is, at least one of the NIC ports LAN0 and LAN1 is enabled, Step S109 is directly performed to continue executing the POST. If the control options indicate to disable all the NIC ports LAN0 and LAN1 of the NIC 230, the BIOS 210 performs Step S108, so as to set a link disable set value of a root port of the NIC 230 to be disabled (for example, a logic value 1). Then, Step S109 is performed to continue executing the POST.

To sum up, in the present invention, two or more control options are set in the BIOS 210, and the control unit 220 is combined, so that the user may directly individually control the NIC ports LAN0 and LAN1 of the NIC 230 through the BIOS. In addition, the reference code process restarts the system, so that the action of controlling the NIC ports in the BIOS is set before the reference code process is completed, so that the set of the hardware becomes effective after the computer 200 is restarted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling a multi-port Network Interface Card (NIC), comprising:
providing a multi-port NIC in a computer, wherein the multi-port NIC comprises a plurality of NIC ports;
providing a Basic Input/Output System (BIOS) with a memory, defining an address space in the memory, and establishing an option catalog in the address space, wherein the option catalog comprises a plurality of disable instructions corresponding to the NIC ports;
providing a control unit, wherein the control unit is electrically connected to the memory of the BIOS and the multi-port NIC, and generates a plurality of control signals corresponding to the NIC ports;
starting the computer, and the control signals respectively disabling the NIC ports corresponding to the disable instructions, when the BIOS detects that the disable instructions are effective; and
restarting the computer, and the disabled NIC ports stopping performing data transmission with outside of the computer.

2. The method for controlling a multi-port NIC according to claim 1, wherein the control unit receives a clock signal, a data stream, and a frame recognition signal from the BIOS, reads the signals on the basis of the clock signal according to a data transmission protocol, and discriminates starting points of a plurality of data segments in the data stream according to the frame recognition signal, so as to interpret first data in the data stream, and the control unit further generates the plurality of control signals corresponding to the NIC ports according to the first data.

3. The method for controlling a multi-port NIC according to claim 1, wherein the plurality of control signals disables the corresponding NIC ports by changing logic levels of corresponding pins of the multi-port NIC.

4. The method for controlling a multi-port NIC according to claim 1, further comprising:

setting an option function chart in the BIOS, wherein the option function chart comprises a plurality of control options, respectively corresponding to the disable instructions in the option catalog.

5. The method for controlling a multi-port NIC according to claim 4, further comprising:

executing a Power On Self Test (POST) after restarting the computer;

detecting the control options in the POST; and setting a link disable set value of a root port of the multi-port NIC to be disabled, if the control options indicate to disable all the NIC ports.

6. The method for controlling a multi-port NIC according to claim 1, wherein the option catalog further comprises enable instructions of the multi-port NIC, and when the BIOS detects that the enable instructions are effective, the control signals respectively enable the NIC ports corresponding to the enable instructions.

\* \* \* \* \*